United States Patent
Ohashi et al.

(10) Patent No.: US 8,314,861 B2
(45) Date of Patent: Nov. 20, 2012

(54) IMAGING APPARATUS AND CAPTURE ASSIST MARK USAGE CONTROL METHOD

(75) Inventors: Hisashi Ohashi, Kanagawa (JP); Kuniaki Sakai, Kanagawa (JP); Isao Sasaki, Chiba (JP)

(73) Assignee: Sony Corporation, Tokyo (JP)

( * ) Notice: Subject to any disclaimer, the term of this patent is extended or adjusted under 35 U.S.C. 154(b) by 458 days.

(21) Appl. No.: 10/585,086

(22) PCT Filed: Oct. 6, 2005

(86) PCT No.: PCT/JP2005/018547
§ 371 (c)(1),
(2), (4) Date: May 27, 2009

(87) PCT Pub. No.: WO2006/048992
PCT Pub. Date: May 11, 2006

(65) Prior Publication Data
US 2009/0225179 A1    Sep. 10, 2009

(30) Foreign Application Priority Data
Nov. 4, 2004   (JP) ................. 2004-320464

(51) Int. Cl.
*H04N 5/262* (2006.01)
*H04N 5/228* (2006.01)
*H04N 5/222* (2006.01)

(52) U.S. Cl. .......... 348/239; 348/222.1; 348/333.02; 348/333.03; 348/333.12

(58) Field of Classification Search ....... 348/222.1–239, 348/333.01–333.12, 722
See application file for complete search history.

(56) References Cited

U.S. PATENT DOCUMENTS

| | | | |
|---|---|---|---|
| 5,787,313 A | | 7/1998 | Compton et al. |
| 5,873,007 A | | 2/1999 | Ferrada Suarez |
| 6,188,432 B1 | * | 2/2001 | Ejima .................. 348/240.99 |
| RE38,079 E | * | 4/2003 | Washino et al. ............ 348/722 |
| 6,806,906 B1 | * | 10/2004 | Soga et al. ............... 348/333.03 |
| 7,511,742 B2 | * | 3/2009 | Ito et al. .................. 348/231.2 |
| 2002/0140711 A1 | | 10/2002 | Saito |

(Continued)

FOREIGN PATENT DOCUMENTS
EP    0 411 440 A2    7/1990

(Continued)

OTHER PUBLICATIONS

European Search Report mailed Sep. 29, 2009, in corresponding European Patent Application No. 05 79 0612.

*Primary Examiner* — Sinh Tran
*Assistant Examiner* — Mark Monk
(74) *Attorney, Agent, or Firm* — Finnegan, Henderson, Farabow, Garrett & Dunner, LLP

(57) ABSTRACT

Multiple capture assist marks (markers for capture assistance) to be synthesized with video captured by a camera unit 10 is generated by an OSD unit 20 through the control of a control unit 100. These capture assist marks are synthesized with the video from the camera unit 10 by synthesis means and displayed. In this case, an operation unit 110 is used to accept input of an instruction about the capture assist mark from a user. Based on this instruction input, the control unit 100 controls the OSD unit 20 and a baseband processing unit 30 to synthesize the capture assist mark corresponding to the instruction with a video signal from the camera unit 10.

15 Claims, 11 Drawing Sheets

U.S. PATENT DOCUMENTS

| | | | |
|---|---|---|---|
| 2004/0257458 A1 * | 12/2004 | Huang et al. | 348/333.01 |
| 2005/0046725 A1 * | 3/2005 | Sasagawa | 348/333.01 |

FOREIGN PATENT DOCUMENTS

| | | |
|---|---|---|
| EP | 0 559 478 A1 | 3/1993 |
| JP | 2-149832 | 6/1990 |
| JP | 04-127780 | 4/1992 |
| JP | 5-292400 | 11/1993 |
| JP | 10-070675 | 3/1998 |
| JP | 11-218820 | 8/1999 |
| JP | 2000-316109 | 11/2000 |
| JP | 2002-290785 | 10/2002 |
| JP | 2002-290786 | 10/2002 |
| WO | WO 96/31050 | 10/1996 |

* cited by examiner

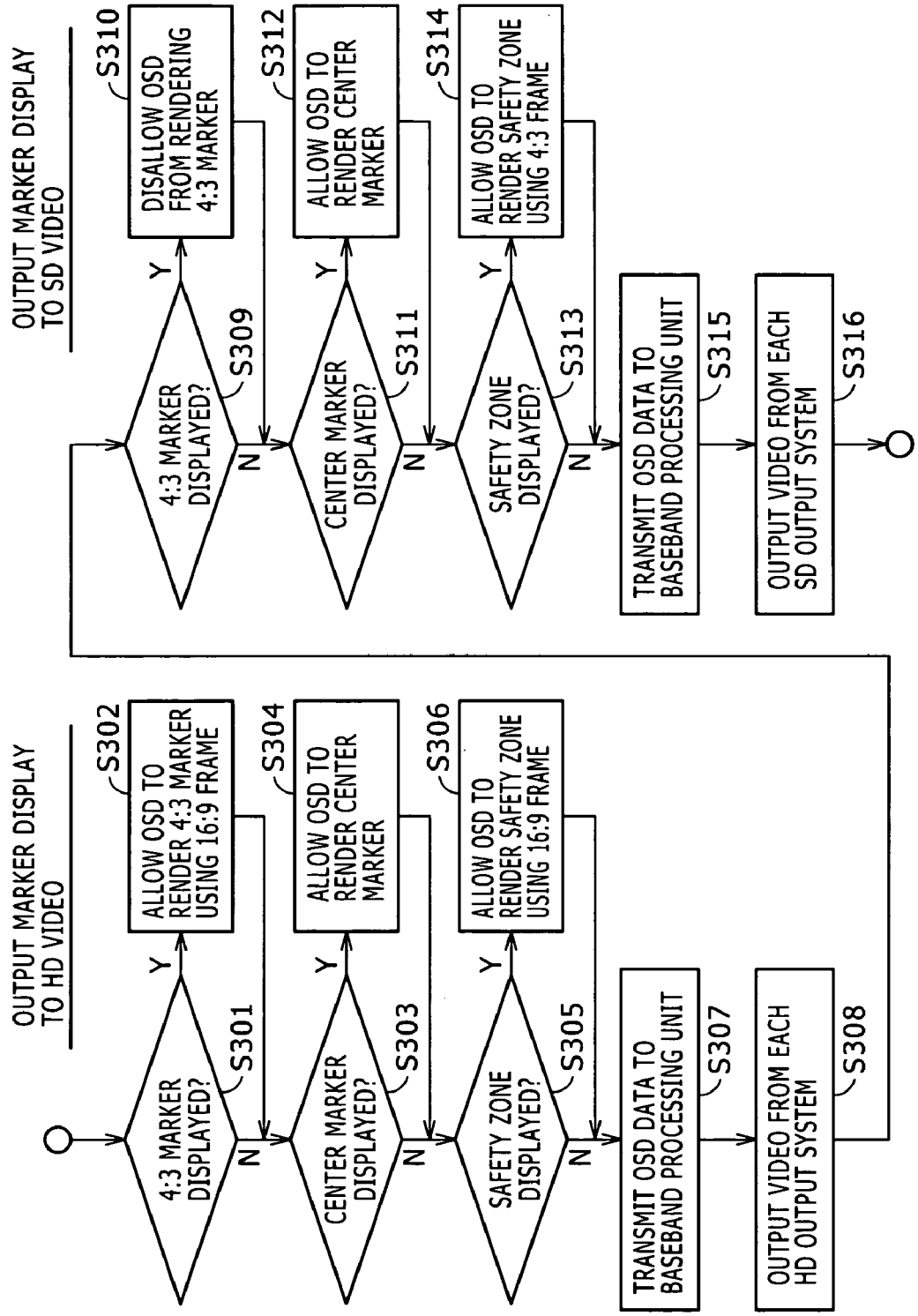

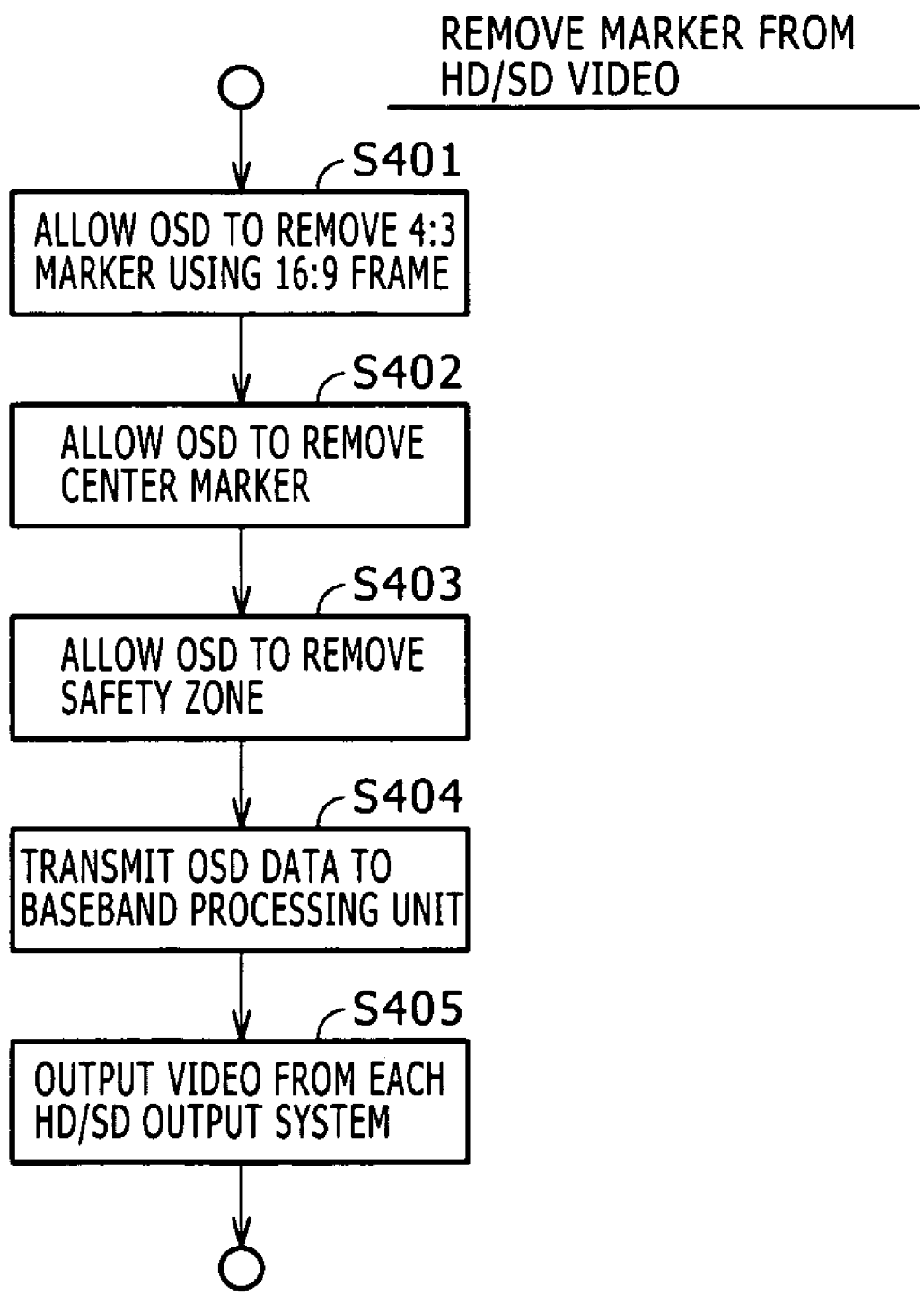

IMAGING APPARATUS AND CAPTURE ASSIST MARK USAGE CONTROL METHOD

TECHNICAL FIELD

The present invention relates to an imaging apparatus exemplified by video cameras and still cameras and to a control method of using capture assist marks used for the imaging apparatus.

BACKGROUND ART

There are widely used various imaging apparatuses such as video cameras and still cameras. In recent years, some imaging apparatuses are capable of switching between capturing of video (images) with an aspect ratio (horizontal to vertical ratio) of 16:9 and capturing of videos (images) with an aspect ratio of 4:3. Such imaging apparatus uses the viewfinder with an aspect ratio of 16:9 so as to comply with videos with an aspect ratios of both 16:9 and 4:3.

When capturing a video with an aspect ratio of 4:3, however, such imaging apparatus displays the video with an aspect ratio of 4:3 on a viewfinder with an aspect ratio of 16:9. This may make it difficult to determine the range of an actually effective capturing area.

In consideration for this, JP-A No. 070675/1998 discloses the technology of displaying a marker (effective capturing frame) and the like to indicate an effective capturing area with an aspect ratio of 4:3 in a viewfinder with an aspect ratio of 16:9. The technology described in JP-A No. 070675/1998 makes it possible to accurately recognize the effective capturing area for a video displayed in the viewfinder and appropriately capture an intended image as a video with an aspect ratio of 4:3.

DISCLOSURE OF THE INVENTION

There has been a demand for imaging apparatuses such as video cameras and still cameras to display a marker indicating the center of a field angle and a marker indicating the effective capturing area with an aspect ratio of 4:3 and to recognize the center of the field angle and the range of the 4:3 image frame, for example. That is, it is expected to simultaneously display multiple types of markers for capture assistance.

Even in the event of capturing, the marker for capture assistance may or may not be needed and is requested to be quickly enabled or disabled. In order to synthesize the marker for capture assistance with a video, for example, a user needs to open a screen for specifying the feature from a menu displayed on a display device such as an LCD (Liquid Crystal Display) provided on the imaging apparatus and display or hide the marker for capture assistance. Consequently, it is difficult to perform a quick-response operation such as displaying or hiding the marker for capture assistance while visually checking an object to be captured.

According to a well-known technology, an external monitor only outputs a so-called SD (Standard Definition) video with an aspect ratio of 4:3. No special process is needed to display a capture assist frame on the external monitor. It has been possible to display the marker for capture assistance as intended correspondingly to a video on the viewfinder.

However, some imaging apparatus may handle both a so-called HD (High Definition) video with an aspect ratio of 16:9 and the SD video. When such imaging apparatus down-converts a video at an HD (16:9) field angle into a video at an SD (4:3) field angle, it may be also necessary to correct display positions of the marker for capture assistance.

The invention has been made in consideration of the foregoing. It is therefore an object of the invention to provide an imaging apparatus capable of appropriately using multiple capture assist marks so as to satisfy user needs and a control method of using the capture assist marks used for the imaging apparatus.

To solve the above-mentioned problems, an imaging apparatus according to claim 1 of the invention includes:

imaging means for imaging an object and outputting a video signal;

generation means for generating a plurality of types of capture assist marks to be synthesized with a video signal output from the imaging means;

synthesis means for synthesizing a capture assist mark generated by the generation means with the video signal from the imaging means;

acceptance means for accepting instruction input about the capture assist mark; and control means for controlling the generation means and the synthesis means based on the instruction input accepted through the acceptance means and controlling a capture assist mark corresponding to the instruction input so as to be synthesized with the video signal.

According to the imaging apparatus as set forth in claim 1 of the invention, the generation means generates multiple types of capture assist marks (markers for capture assistance) to be synthesized with a video captured by the imaging means. The synthesis means synthesizes these capture assist marks with video from the imaging means.

The acceptance means accepts input of an instruction about the capture assist mark from a user. Based on the accepted instruction input, the control means controls the generation means and the synthesis means to allow the capture assist mark to be synthesized with a video signal from the imaging means.

This acceptance means makes it possible for a user to use multiple types of capture assist marks, wherein: (i) all types of the capture assist marks can be synthesized with video signals from the imaging means and can be used simultaneously; (ii) one or more types of the capture assist marks can be synthesized with video signals from the imaging means and can be used; and (iii) no capture assist mark can be synthesized with video signals from the imaging means. That is, it is possible to appropriately use multiple capture assist marks so as to satisfy user needs.

The imaging apparatus as set forth in claim 2 is compliant with the imaging apparatus as set forth in claim 1 and includes:

selection input acceptance means for accepting selection input of a plurality of capture modes to generate differently formatted video signals; and capture mode change means for controlling the imaging means in accordance with the selection input accepted through the selection input acceptance means and enabling a selected capture mode, wherein the control means controls the generation means so as to generate the capture assist mark in accordance with a selected capture mode.

The imaging apparatus as set forth in claim 2 of the invention allows the use of multiple capture modes. For example, there is available an HD mode for capturing images with an aspect ratio of 16:9. There is available an SD mode for capturing images with an aspect ratio of 4:3. Another mode is used to capture intended video as an video signal in compliance with the NTSC (National Television System Committee) system. Yet another mode is used to capture intended video as an video signal in compliance with the PAL (Phase Alternation by Line) system.

In this case, the control means controls the generation means in accordance with the selected capture mode. Even when the acceptance means transfers an instruction to generate the capture assist mark, the generation means controlled by the control means does not generate the capture assist mark in accordance with the capture mode, changes the specified capture assist mark to another capture assist mark, or adjusts the capture assist mark. It is possible to automatically prevent a meaningless or inappropriate capture assist mark from being generated and used. In this manner, it is possible to appropriately use multiple capture assist marks so as to satisfy user needs.

The imaging apparatus as set forth in claim 3 is compliant with the imaging apparatus as set forth in claim 1 or 2 and includes:

selection input acceptance means for accepting selection input of a plurality of capture modes to generate differently formatted video signals; and capture mode change means for controlling the imaging means in accordance with the selection input accepted through the selection input acceptance means and enabling a selected capture mode, wherein the control means controls whether or not to synthesize a capture assist mark generated by the generation means in accordance with a selected capture mode.

The imaging apparatus as set forth in claim 3 of the invention allows the use of multiple capture modes. For example, there is available an HD mode for capturing images with an aspect ratio of 16:9. There is available an SD mode for capturing images with an aspect ratio of 4:3. Another mode is used to capture intended video as an video signal in compliance with the NTSG system. Yet another mode is used to capture intended video as an video signal in compliance with the PAL system.

In this case, the control means controls the synthesis means in accordance with the selected capture mode. Even when the acceptance means transfers an instruction to generate the capture assist mark, the synthesis means controlled by the control means does not synthesize the capture assist mark in accordance with the capture mode. It is possible to automatically prevent a meaningless or inappropriate capture assist mark from being synthesized with video signals. In this manner, it is possible to appropriately use multiple capture assist marks so as to satisfy user needs.

The imaging apparatus as set forth in claim 4 is compliant with the imaging apparatus as set forth in claim 1 and includes:

a plurality of output terminal unit which use different formats to output video signals output from the imaging means, wherein the generation means generates the capture assist marker in accordance with a format of the video signal to be supplied to each of the plurality of output terminal units; and wherein the synthesis means synthesizes the corresponding capture assist mark with the video signal to be supplied to each of the plurality of output terminal units.

For example, the imaging apparatus as set forth in claim 4 of the invention may be provided with multiple output terminal units to handle video signals having different signal formats such as an LCD having a display screen with an aspect ratio of 16:9 and an SD (Standard Definition) terminal to output video signals with an aspect ratio of 4:3. In this case, the control means controls the generation means to generate the capture assist mark that is specified to be generated and corresponds to the format of a video signal to be supplied to each of the output terminals. The synthesis means synthesizes the corresponding capture assist mark with each of the differently formatted video signals that are supplied to the output terminals.

This prevents an unnecessary capture assist mark from being generated and synthesized with video signals supplied to the output terminals. Accordingly, it is possible to appropriately use multiple capture assist marks so as to satisfy user needs.

The imaging apparatus as set forth in claim 5 is compliant with the imaging apparatus as set forth in claim 1, wherein the acceptance means can accept selection input of a capture assist mark generated at least from the plurality of types of capture assist marks.

According to the imaging apparatus as set forth in claim 5 of the invention, the acceptance means can be used to select an intended capture assist mark at least from multiple capture assist marks. A user can use only necessary capture assist marks. Accordingly, it is possible to appropriately use multiple capture assist marks so as to satisfy user needs.

The imaging apparatus as set forth in claim 6 is compliant with the imaging apparatus as set forth in claim 1, 2, 3, or 4 and includes:

change input acceptance means for directly accepting input for a change between displaying and hiding the plurality of capture assist marks as a whole generated by the generation means; and change control means for changing between displaying and hiding the plurality of capture assist marks in accordance with the change input accepted through the change input acceptance means.

The imaging apparatus as set forth in claim 6 is provided with the change input acceptance means that can accept only specification of displaying or hiding capture assist marks. This makes it possible to fast and easily switching between displaying and hiding the capture assist marks during capturing. Accordingly, it is possible to appropriately use multiple capture assist marks so as to satisfy user needs.

The invention makes it possible to appropriately use multiple capture assist marks so as to satisfy user needs. The capture composition so far based on an experimental estimation can be completed in a shorter time than before.

BRIEF DESCRIPTION OF DRAWINGS

FIG. 10 is a flowchart showing a process to display the capture assist markers;

FIG. 11 is a flowchart showing a process to remove the display of all the capture assist markers;

BEST MODE FOR CARRYING OUT THE INVENTION

An embodiment of the apparatus and the method according to the invention will be described in further detail with reference to the accompanying drawings. The following embodiment describes examples of applying the method according to the invention to a digital video camera.

Digital Video Camera

Figure 1:
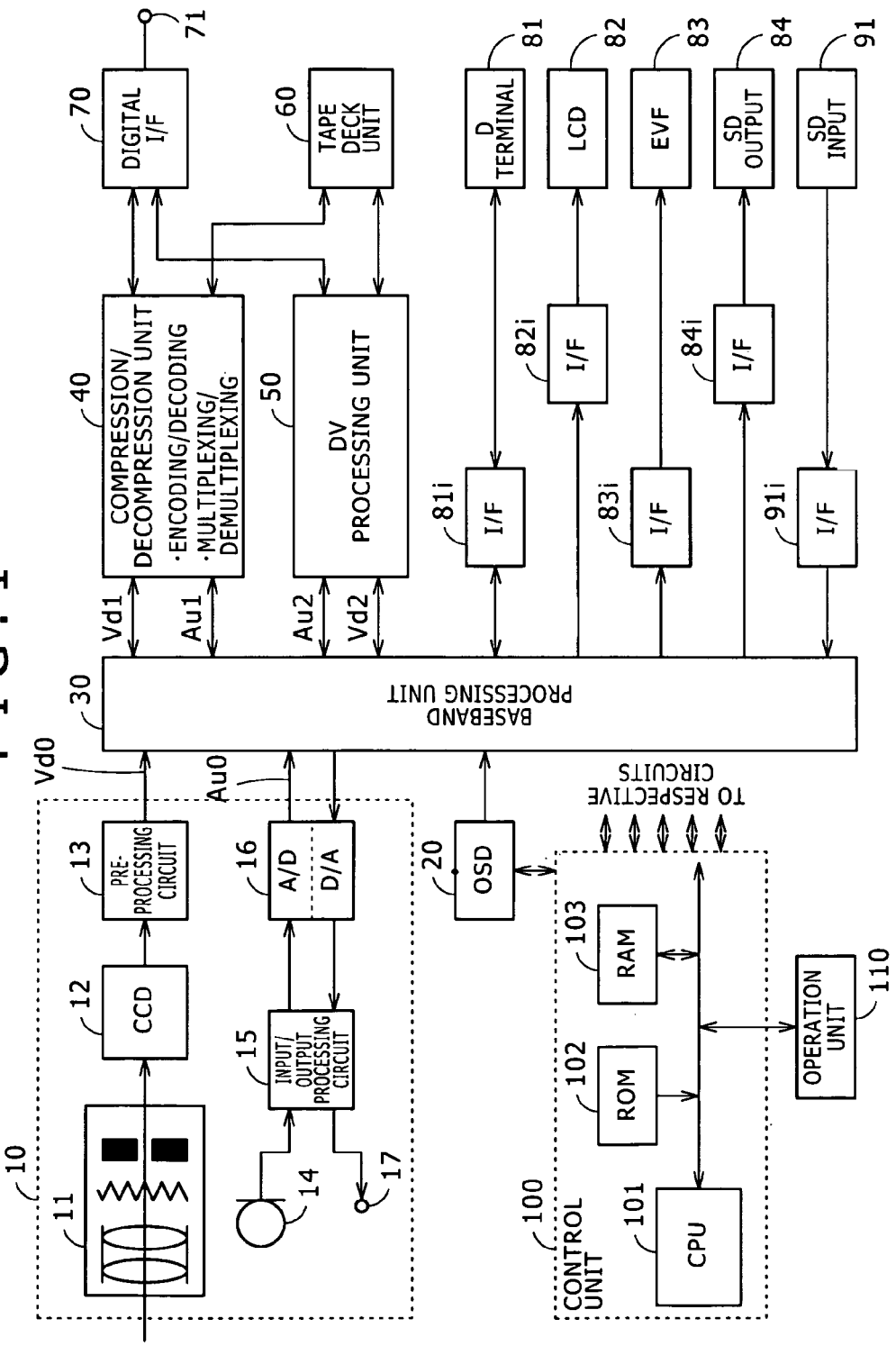
FIG. 1 is a block diagram showing a digital video camera compliant with an embodiment of the apparatus and the method according to the invention.

FIG. 1 is a block diagram showing a digital video camera compliant with an embodiment of the apparatus and the method according to the invention. As shown in FIG. 1, the digital video camera according to the embodiment includes a camera unit 10, an OSD (On Screen Display) unit 20, a baseband processing unit 30, a compression/decompression unit 40, a DV (Digital Video) processing unit 50, a tape deck unit 60, a digital interface (hereafter referred to as a digital I/F) 70, and a digital input/output terminal 71.

The digital video camera according to the embodiment is provided with output and input terminal units for video. The output terminal unit includes a D terminal 81, an LCD 82, an EVF (Electro View Finder) 83, and an SD output terminal 84. The input terminal unit includes an SD input terminal 91. The digital video camera further has interfaces 81i, 82i, 83i, 84i, and 91i (depicted simply as the I/F in FIG. 1) corresponding to the output and input terminal units. The digital video camera also has a control unit 100 to control these components.

As shown in FIG. 1, the control unit 100 is a microcomputer composed of a CPU (Central Processing Unit) 101, ROM (Read Only Memory) 102, and RAM (Random Access Memory) 103 connected with each other via a CPU bus. The ROM 102 represents flash ROM or EEPROM (Electrically Erasable and Programmable ROM). The ROM 102 records various programs executed on the CPU 101 and data needed for its processes. The ROM 102 can accept and store setup information such as user-specified parameters. In the description to follow, the ROM 102 is assumed to be flash ROM. The RAM 103 is mainly used as a work area for temporarily storing intermediate results of processes, for example.

The control unit 100 connects with an operation unit 110 provided with various operation keys and operation dials. The operation unit 110 can accept operation input from users. In this manner, the control unit 100 can control the respective units in accordance with user's input instruction input (input operation) accepted via the operation unit 110.

For simplicity of description, the camera unit 10 of the digital video camera according to the embodiment is assumed to be composed of a video system and an audio system. That is, the video system of the camera unit 10 is composed of an optical block 11 having a lens, a focus mechanism, a shutter mechanism, an aperture (iris) mechanism, and the like, a CCD (Charge Coupled Device) 12, and a preprocessing circuit 13. The audio system is composed of a microphone, an input/output processing unit 15, a conversion unit 16 for A/D (Analog/Digital) conversion and D/A (Digital/Analog) conversion, and an audio output terminal 17.

The video system of the camera unit 10 according to the embodiment has two capture modes: an HD mode to capture an object as a video with an aspect ratio of 16:9 and an SD mode to capture an object as a video with an aspect ratio of 4:3. Under control of the control unit 100 in accordance with user's instruction input, the video system can select which capture mode should be used to capture videos.

When accepting instruction input for capturing from the operation unit 110, the control unit 100 controls the units of the digital video camera according to the embodiment to start a capture operation. In this case, the optical block 11 follows the control from the control unit 100 to control the focus mechanism, the shutter mechanism, and the iris mechanism. The optical block 11 captures the object's video and supplies it to the CCD 12.

The CCD 12 photoelectrically converts the video from the optical block 11 and outputs it. The CCD 12 captures the object's video from the optical block 11 and supplies the preprocessing circuit 13 with the captured object's video (image information) as an electric signal. The preprocessing circuit 13 applies a CDS (Correlated Double Sampling) process to the supplied video signal to keep a good S/N ratio. The preprocessing circuit 13 further performs an AGC (Automatic Gain Control) process to control a gain. In addition, the preprocessing circuit 13 performs A/D (Analog/Digital) conversion to generate video data Vd0 in the form of a digital signal and supplies it to the baseband processing unit 30.

During the capture, audio collected through the microphone 14 is converted into an electric signal, is processed to be amplified, for example, in the input/output processing unit 15, and then is supplied to the conversion unit 16. The conversion unit 16 converts an analog audio signal from the input/output unit 15 into a digital signal that results in audio data Au0. The conversion unit 16 supplies audio data Au0 to the baseband processing unit 30.

As will be described in more detail below, the baseband processing unit 30 responds to control from the control unit 100 and receives graphics or text data to be synthesized with video data such as the capture assist mark from the OSD unit 20. The baseband processing unit 30 processes this data, for example, so as to be synthesized with video data Vd0 from the camera unit 10 to generate video data. The baseband processing unit 30 supplies video data Vd0 to the other components such as the compression/decompression unit 40, the DV processing unit 50, the D terminal 81, the LCD 82, the EVF 83, and the SD output terminal 84. As will be described in more detail below, the OSD processing unit 30 can generate multiple types of capture assist marks in response to control from the control unit 100.

There may be a case where the baseband processing unit 30 processes video data (HD signal) with an aspect ratio of 16:9 captured in the HD mode. In this case, the baseband processing unit 30 supplies video data (HD signal) Vd1 and audio data Au1 to the compression/decompression unit 40. The compression/decompression unit 40 uses the MPEG (Moving Picture Experts Group) system, for example, to compress (encode) the supplied video data Vd1 and audio data Au1 to multiplex the compressed video data and audio data.

The compression/decompression unit 40 multiplexes the video data and the audio data to generate multiplexed data (MPEG signal). The multiplexed data is supplied to the tape deck unit 60 and is recorded on DV (Digital Video) tape mounted thereon. Further, the multiplexed data can be output via the digital I/F 70 and the digital input/output terminal 71.

In the digital video camera according to the embodiment, the digital I/F 70 and the digital input/output terminal 71 represent interfaces compliant with the IEEE (Institute of Electrical and Electronics Engineers) 1394 standard, for example. Obviously, the digital I/F 70 and the digital input/ output terminal 71 can use digital interfaces compliant with the other standards such as USB (Universal Serial Bus).

There may be a case where the baseband processing unit 30 processes a DV system signal (DV signal). In this case, the baseband processing unit 30 supplies video data (DV signal) Vd2 and audio data Au2 to the DV processing unit 50. The DV processing unit 50 multiplexes the supplied video data Vd2 and audio data Au2.

The DV processing unit 50 multiplexes the video data and the audio data to generate multiplexed data. The multiplexed data is supplied to the tape deck unit 60 and is recorded on DV (Digital Video) tape mounted thereon. Further, the multiplexed data can be output via the digital I/F 70 and the digital input/output terminal 71.

During the capture, as mentioned above, the baseband processing unit 30 supplies video signals from the camera unit 11 also to the D terminal 81, the LCD 82, the EVF 83, and the SD output terminal 84. The D terminal 81 in an analog interface to output an HD signal in an analog format, for example. The D terminal according to the embodiment is called a D4 terminal compliant with 480i, 480p, 1080i, and 780p, and is capable of outputting video signals with an aspect ratio of 16:9.

In the representation of "480i" and "480p", the numeral denotes the number of effective scanning lines. The letter "i" following the numeral denotes that the video signal is compliant with the interlace scanning system. The letter "p" following the numeral denotes that the video signal is compliant with the progressive scanning system. Accordingly, "480i" denotes the interlace video signal composed of 480 effective scanning lines and "480p" denotes the interlace video signal composed of 480 effective scanning lines.

The LCD 82 and the EVF 83 are compatible with video signals with an aspect ratio of 16:9. The SD output terminal 84 is used for analog SD video signals with an aspect ratio of 4:3. The output terminals 81, 82, 83, and 84 are provided with the I/Fs 81*i*, 82*i*, 83*i*, and 84*i*, respectively. These interfaces have the function of converting video data from the baseband processing unit 30 into analog video signals to be supplied to the corresponding video output terminal units.

There may be a case of supplying an MPEG signal (multiplexed signal of video data and audio data compressed in MPEG) via the digital input/output terminal 71 and the digital I/F 70. Alternatively, there may be a case of reading an MPEG signal from the DV tape mounted on the tape deck unit 60. These MPEG signals are supplied to the compression/decompression unit 40 and are separated into video data and audio data here. In addition, the data is decompressed to restore the original video data and audio data before the data compression. The restored video data and audio data are supplied to the baseband processing unit 30.

The base band processing unit 30 is supplied with video data and audio data from the compression/decompression unit 30. The baseband processing unit 30 supplies video data to the D terminal 81, the LCD 82, the EVF 83, and the SD output terminal 84. Audio data is supplied to the conversion unit 16 and is converted into an analog audio signal here. The input/output processing unit 15 then processes the analog signal so as to harmonize the signal format, for example. The analog audio output terminal 17 outputs the analog audio signal.

Similarly, there may be a case of supplying a DV signal (multiplexed signal of video data and audio data according to the DV system) via the digital input/output terminal 71 and the digital I/F 70. Alternatively, there may be a case of reading a DV signal from the DV tape mounted on the tape deck unit 60. The DV signal is supplied to the DV processing unit 50 and is separated into video data and audio data here. The video data and audio data are supplied to the baseband processing unit 30.

Similarly to the above-mentioned reproduction of MPEG signals, the baseband processing unit 30 is supplied with video data and audio data from the compression/decompression unit 30. The baseband processing unit 30 supplies video data to the D terminal 81, the LCD 82, the EVF 83, and the SD output terminal 84. Audio data is supplied to the conversion unit 16 and is converted into an analog audio signal here. The input/output processing unit 15 then processes the analog signal so as to harmonize the signal format, for example. The analog audio output terminal 17 outputs the analog audio signal.

When accepting MPEG or DV signals through the digital I/F, the digital video camera can record these signals on DV tape mounted on the tape deck unit 60. The digital video camera can also record SD signals accepted through the SD input terminal 91 on DV tape mounted on the tape deck unit 60. The I/F 91*i* has the function of, for example, converting an SD signal accepted through the SD input terminal 91 into a digital signal.

As mentioned above, when the camera unit 10 is used to capture video signals and collect audio signals, the digital video camera according to the embodiment can convert these signals into digital signals and output or record them on DV tape. In addition, the digital video camera can convert video signals and audio signals accepted through the input/output terminal and the input terminal into digital signals and output or record them on DV tape. Further, the digital video camera can reproduce video data and audio data that are recorded on the DV tape or are accepted through the input/output terminal and the input terminal.

Using Multiple Capture Assist Marks (Claims 1 and 7)

Figure 2:
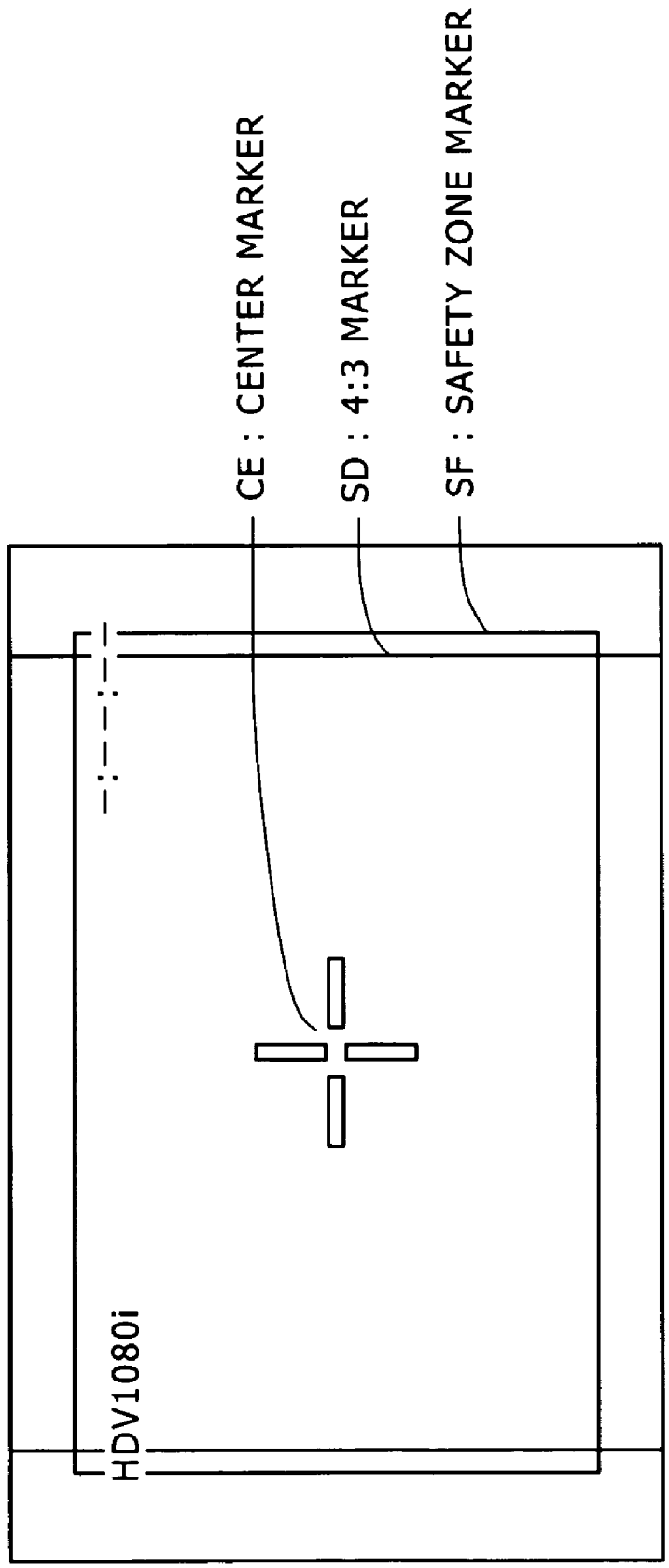
FIG. 2 shows capture assist markers available for the digital video camera as shown in FIG. 1.

As mentioned above, the digital video camera according to the embodiment can allow the OSD unit 20 to generate multiple capture assist markers (including capture assist marks such as a capture assist frame). The multiple capture assist markers can be synthesized with video data. FIG. 2 shows capture assist marks available for the digital video camera according to the embodiment.

As shown in FIG. 2, the digital video camera according to the embodiment can use three types of capture assist markers: a center marker CE, a 4:3 marker SD, and a safety zone marker SF. In FIG. 2, information indicating a capture mode is displayed at the top left end of the screen, and information indicating a time code is displayed at the top right end of the screen.

In FIG. 2, the center marker CE is displayed like a cross at the center of the screen and is used to align the center and approximately horizontal and vertical levels for video. In FIG. 2, the 4:3 marker SD is composed of two lines that are each provided at the left and right ends of the screen so as to connect the top and the bottom of the screen. The 4:3 marker SD indicates an effective field angle (effective capture area) as SD video when an HD video at 16:9 field angle is down-converted into an SD video. The safety zone marker SF is used to reproduce captured video and simulates an area (frame) supposed to be displayed on most ordinary television sets.

The digital video camera according to the embodiment enables the use of any combinations of three types of capture assist markers as shown in FIG. 2. That is, it is possible to simultaneously use all the three types of capture assist markers, i.e., the center marker CE, the 4:3 marker SD, and the safety zone marker SF. Further, it is possible to use any two of the three types of capture assist markers. Moreover, it is possible to use any one of the three types of capture assist markers. Furthermore, it is possible to use none of the capture assist markers.

Figure 3:
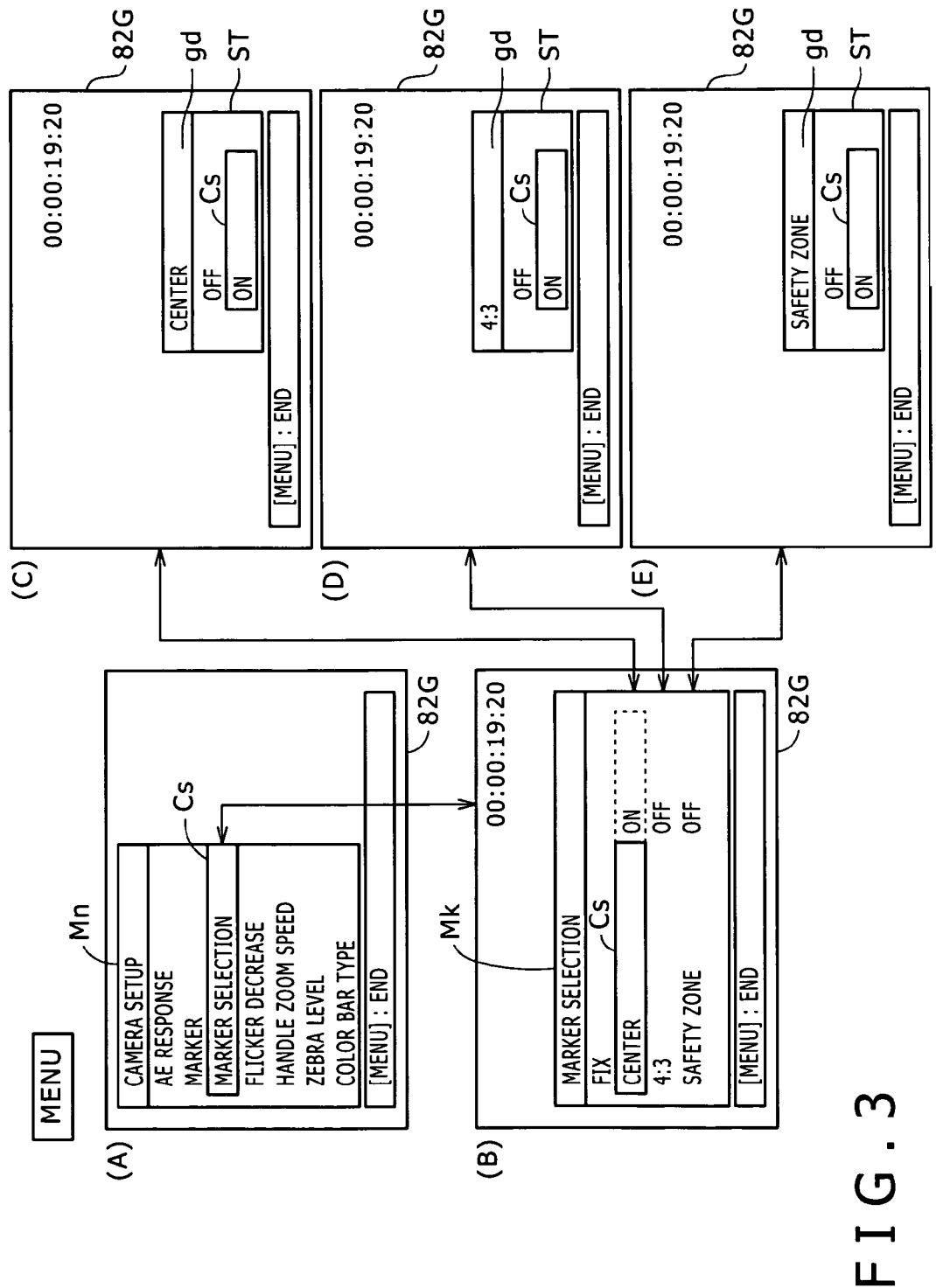
FIG. 3 illustrates processes to select a capture assist marker to be used.
Figure 4:
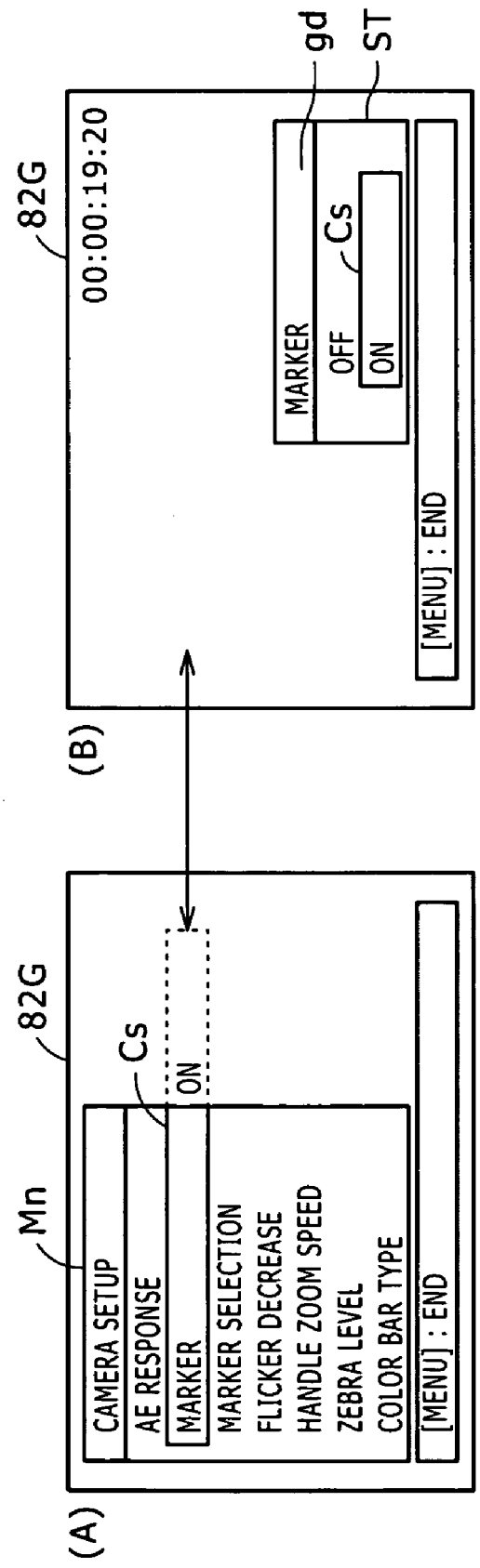
FIG. 4 illustrates a process to display or hide the entire capture assist marker.

FIG. 3 illustrates operations to select the capture assist marker to be displayed for use. FIG. 4 illustrates operations to display or hide the entire capture assist marker. The digital video camera according to the embodiment allows these operations to be performed through the use of a menu displayed on a display screen 82G of the LCD 82 and the operation unit 10.

The digital video camera according to the embodiment operates as follows. When a user performs a specified operation such as pressing a menu key, for example, the control unit 100 controls the OSD processing unit 20 and the baseband processing unit 30 to display camera setup menu Mn on the display screen 82G of the LCD 82 as shown in FIG. 3(A).

In this case, as shown in FIG. 3(A), the camera setup menu Mn includes selection items such as AE (Auto Exposure) response, marker, marker selection, flicker decrease, handle zoom speed, zebra level, and color bar type. When the screen cannot display some or all of the selection items, the camera setup menu Mn has the function of scrolling the screen to display the intended items. A user can operate an arrow key on the operation unit 110 to position a cursor Cs to an intended selection item. The user can perform a specified fix operation such as pressing a fix key. In response to this, the control unit 100 performs a process corresponding to the selection item where the cursor is positioned.

Let us suppose that the user positions the cursor Cs to the marker selection item of the camera setup menu Mn in FIG. 3(A) and then performs the fix operation. The control unit 100 then controls the OSD processing unit 20 and the baseband processing unit 30 to display marker selection menu Mk as shown in FIG. 3(B) on the display screen 82G.

The marker selection menu in FIG. 3(B) enables to select any of the three types of capture assist markers described with reference to FIG. 2, i.e., the center marker CE, the 4:3 marker SD, and the safety zone marker SF. The user can then position the cursor Cs to the selection item for selecting the intended capture assist marker and select a fix display at the top. As shown in FIGS. 3(C), 3(D), and 3(E), the display screen 82G of the LCD 82 displays screens to display or hide (turn on or off) the selected capture assist markers.

In FIG. 3(B), the indication "ON" or "OFF" is provided to the right of the item for selecting each capture assist marker to identify whether each capture assist marker is currently displayed or hidden. Therefore, FIG. 3(B) shows that only the center marker is currently displayed and the other markers such as the 4:3 marker and the safety zone marker are hidden.

Let us assume that the user positions the cursor Cs to the selection item for selecting the center marker from the marker selection menu in FIG. 3(B). The control unit 100 controls the OSD unit 20 and the baseband processing unit 30 to display the setup screen for displaying or hiding the center marker on the display screen 82G of the LCD 82 as shown in FIG. 3(C). As shown in FIG. 3(C), the screen shows a guide display gd and a selection item display ST. The guide display gd indicates what the selected capture assist marker means. The selection item display ST contains two selection items "OFF (disable)" and "ON (enable)" to display or hide the capture assist marker.

The user can select either of the two selection items "OFF (disable)" and "ON (enable)." Positioning the cursor Cs to "OFF (disable)" hides the center marker CE. Positioning the cursor Cs to "ON (enable)" displays the center marker CE. In this manner, the center marker CE can be displayed or hidden.

The user can fix the selection by positioning the cursor Cs to the selection and then performing a specified fix operation. When the user selects an end item at the bottom of the menu, the control unit 100 controls the OSD unit 20 and the baseband processing unit 30 to terminate the display in FIG. 3(C). The screen returns to the display of the marker selection menu Mk in FIG. 3(B).

From the marker selection menu in FIG. 3(B), the user can position the cursor Cs to the selection item for selecting the 4:3 marker and then perform the fix operation. The control unit 100 controls the OSD unit 20 and the baseband processing unit 30 to display the setup screen for displaying or hiding the 4:3 marker on the display screen 82G of the LCD 82 as shown in FIG. 3(D).

Also in FIG. 3(D), the screen shows the guide display gd and the selection item display ST. The guide display gd indicates what the selected capture assist marker means. The selection item display ST contains two selection items "OFF (disable)" and "ON (enable)" to display or hide the capture assist marker. Similarly to the case described with reference to FIG. 3(C), the user can display or hide the 4:3 marker.

From the marker selection menu in FIG. 3(B), the user can position the cursor Cs to the selection item for selecting the safety zone marker and then perform the fix operation. The control unit 100 controls the OSD unit 20 and the baseband processing unit 30 to display the setup screen for displaying or hiding the safety zone marker on the display screen 82G of the LCD 82 as shown in FIG. 3(D).

Also in FIG. 3(E), the screen shows the guide display gd and the selection item display ST. The guide display gd indicates what the selected capture assist marker means. The selection item display ST contains two selection items "OFF (disable)" and "ON (enable)" to display or hide the capture assist marker. Similarly to the case described with reference to FIG. 3(C), the user can display or hide the safety zone marker.

In this manner, the digital video camera according to the embodiment can display or hide each of the three available capture assist markers, i.e., the center marker CE, the 4:3 marker SD, and the safety zone marker SF.

When the user selects the fix item at the top of the menu in FIG. 3(B), the control unit 100 controls the OSD unit 20 and the baseband processing unit 30 to terminate the display shown in FIG. 3(B) and returns the display to the camera setup menu Mn shown in FIG. 3(A). When the user presses a [MENU] key at the bottom of the guide display in the camera setup menu Mn in FIG. 3(A), the control unit 100 controls the OSD unit 20 and the baseband processing unit 30 to terminate the display shown in FIG. 3(A).

As described with reference to FIG. 3, the digital video camera according to the embodiment enables or disables the display of each of the three available types of capture assist markers, and then provides the confirmation whether or not to display the display-enabled marker.

As described with reference to FIG. 3, the user can select (set) the capture assist marker to be displayed for use. As shown in FIG. 4(A), the display returns to the camera setup menu Mn in FIG. 3(A) and the user can then select the "marker" as the selection item. At this time, the control unit 100 controls the OSD unit 20 and the baseband processing unit 30 to display the setup screen for displaying or hiding the capture assist marker shown in FIG. 4(B) on the display screen 82G of the LCD 82.

The screen shows the guide display gd and the selection item display ST. The guide display gd indicates that the screen is configured to enable or disable the display of the entire capture assist marker. The selection item display ST contains two selection items "OFF (disable)" and "ON (enable)" to display or hide the entire capture assist marker. The user can position the cursor Cs to "ON (enable)" and perform the specified fix operation to display the entire capture assist marker. In this case, the user can display all the capture assist markers that are configured to be displayed according to the description with reference to FIG. 3.

The user can position the cursor Cs to "OFF (disable)" and perform the specified fix operation to hide the entire capture assist marker. In this case, the user can hide the capture assist marker even when it is configured to be displayed according to the description with reference to FIG. 3.

In this manner, there are provided the information displayed on the display screen 82G of the LCD 82 and input operations from the operation unit 110. The control unit 100 accepts the information indicating the user-specified displayed or hidden state of each capture assist marker and the information indicating the displayed or hidden state of the entire capture assist marker. The flash ROM 102 of the control unit 100 records and maintains these pieces of information so as to be referenced and used as needed.

The digital video camera according to the embodiment provides the setup process as described with reference to FIG. 3 to configure all the three types of capture assist markers to be displayed. In this case, the OSD unit 20 generates all the center marker CE, the 4:3 marker SD, and the safety zone marker SF as shown in FIG. 2. The baseband processing unit 30 synthesizes these markers with the video signal Vd0 from the camera unit 10. The digital video camera supplies the video output terminal units with the video signal synthesized with the three types of capture assist markers for eventual use.

The digital video camera according to the embodiment provides the setup process as described with reference to FIG. 3 to configure any two of the three types of capture assist markers to be displayed. In this case, the OSD unit 20 generates the two types of capture assist markers configured to be displayed. The baseband processing unit 30 synthesizes these capture assist markers with the video signal Vd0 from the camera unit 10. The digital video camera supplies the video output terminal units with the video signal synthesized with any two types of capture assist markers for eventual use.

Obviously, the digital video camera according to the embodiment provides the set up process as described with reference to FIG. 3 to configure any one of the three types of capture assist markers to be displayed. In this case, the OSD unit 20 generates the one type of capture assist marker configured to be displayed. The baseband processing unit 30 synthesizes the capture assist marker with the video signal Vd0 from the camera unit 10. The digital video camera supplies the video output terminal units with the video signal synthesized with any one type of capture assist marker for eventual use. It is also possible to use none of the capture assist markers by disabling the display of all the capture assist markers.

The digital video camera according to the embodiment can simultaneously display multiple capture assist markers. For example, the digital video camera makes it possible to simultaneously confirm the video center, the range of the 4:3 field angle, and the safety zone. The capture composition so far based on an experimental estimation can be completed in a shorter time than before.

The digital video camera provides multiple displayable capture assist marker patterns (types) for eventual use, making it possible to satisfy needs for various capture aids and settlement of compositions.

Using the Capture Assist Markers in Accordance with the Capture Modes (Claims 2, 3, 8, and 9)

As mentioned above, the digital video camera according to the embodiment has two capture modes. One is the HD mode that captures an object as a video with an aspect ratio of 16:9. The other is the SD mode that captures an object as a video with an aspect ratio of 4:3.

The user can use the operation unit 110 to select which capture mode to use. The control unit 100 accepts the information indicating the selected capture mode and stores and maintains the information in its flash ROM 102, for example. The stored and maintained information can be referenced and used as needed.

When the SD mode is selected for capture, for example, the 4:3 marker SD is meaningless. In consideration for the user-selected capture mode, the control unit 100 of the digital video camera according to the embodiment can provide control to display or hide the capture assist markers.

The SD mode may be selected as the capture mode even when the 4:3 marker is configured to be displayed. In such case, the control unit 100 references the setup information in the flash ROM 102, for example, and controls the OSD unit 20 to prevent the 4:3 marker from being generated. This makes it possible to hide the 4:3 marker SD that is meaningless for the capture in the SD mode.

While there has been described that the control unit 100 provides control to prevent the OSD unit 20 from generating the 4:3 marker SD, the invention is not limited thereto. When the 4:3 marker is configured to be displayed and the SD mode is selected as the capture mode, the control unit 100 may control the baseband processing unit 30 so as not to synthesize the 4:3 marker from the OSD unit 20 with a video signal.

Of course, the control unit 100 can control both the OSD unit 20 and the baseband processing unit 30 so as not to generate an unnecessary capture assist marker. Further, the control unit 100 can prevent the unnecessary capture assist marker from being synthesized with a video signal. The OSD unit 20 generates the capture assist markers. The baseband processing unit 30 synthesizes the capture assist markers. Controlling at least one of these processes can prevent the display of an unnecessary capture assist marker.

While there has been described that the control unit 100 provides control to automatically change the 4:3 marker unneeded when the SD mode is enabled as the capture mode, the invention is not limited thereto. For example, it is possible to provide an NTSC mode and a PAL mode. The NTSC mode enables a captured video to be processed and recorded as an NTSC-based video signal. The PAL mode enables a captured video to be processed and recorded as a PAL-based video signal.

When multiple recording modes are provided, the control unit 100 can control the OSD processing unit 20 so as to generate the capture assist marker corresponding to the selected recording mode. That is, the control unit 100 can generate the center marker and the safety zone marker to be synthesized with NTSC video signals and the safety zone marker to be synthesized with PAL video signals.

Different signal formats are used for the NTSC video signals and the PAL video signals. Even when the capture assist markers are synthesized with the signal formats, it is possible to prevent problems such as unsuccessfully displaying the capture assist marker at an intended position in the video.

In this manner, the formats of video signals to be processed depend on the capture modes and the recording modes. There may be a meaningless, unnecessary capture assist marker when displayed correspondingly to the video signal format. Such unnecessary capture assist marker, when configured to be displayed, can be automatically hidden, eliminating the user's need for reconfiguring the capture assist marker.

Using the Capture Assist Markers Corresponding to Output Terminals (Claims 4 and 10)

As described with reference to FIG. 1, the digital video camera according to the embodiment has the multiple video signal output terminal units (video output terminal units), i.e., the D terminal 81, the LCD 82, the EVF 83, and the SD output terminal 84. Of these video output terminal units, as mentioned above, the D terminal 81, the LCD 82, and the EVF 83 are compatible with video signals with an aspect ratio of 16:9. The SD output terminal 84 is used for SD signals with an aspect ratio of 4:3.

When the camera unit 10 in FIG. 1 supplies an HD video signal, the D terminal 81, the LCD 82, and the EVF 83 can output this signal without down-conversion. In this case, the down-converted HD signal is output to the SD output terminal. According to the embodiment, the digital I/F 70 is used to output video signals and the like in such a manner as to convert HD signals into the MPEG or DV format for output. The HD signal is down-converted only when it is converted into the DV format.

For this reason, the control unit 100 of the digital video camera according to the embodiment controls the OSD processing unit 20 and the baseband processing unit 30. In this manner, the control unit 100 generates the capture assist markers compliant with video signals supplied to the video output terminal units and synthesizes the capture assist markers with the video signals supplied to the video output terminals.

Figure 5:
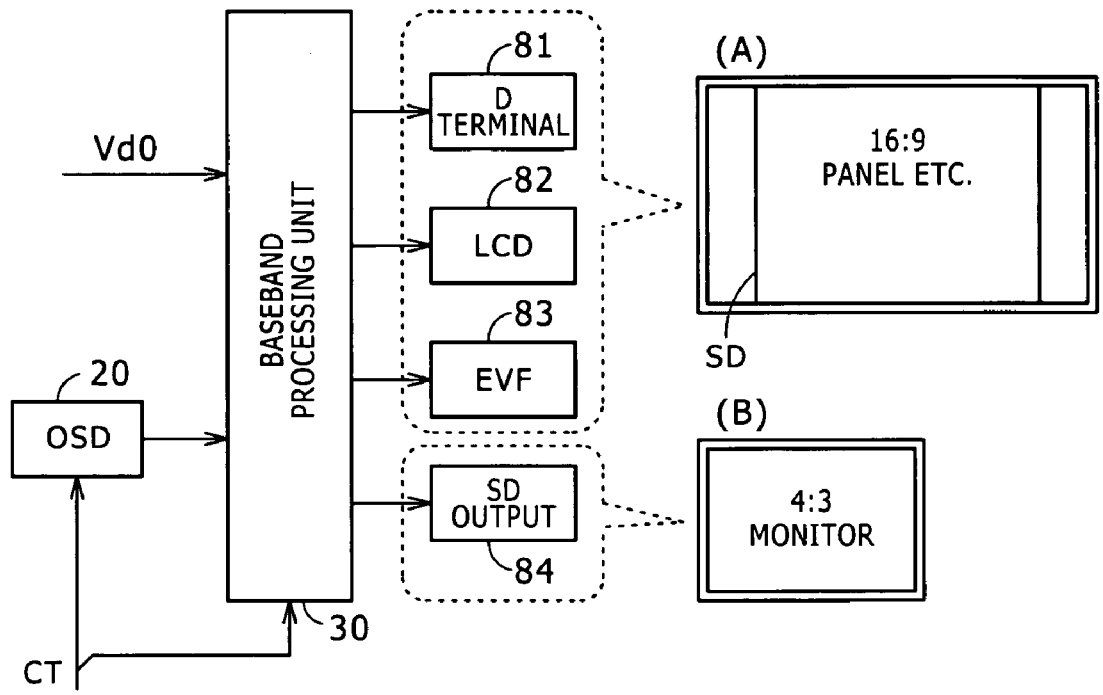
FIG. 5 illustrates the use of a 4:3 marker for each video output terminal.
Figure 6:
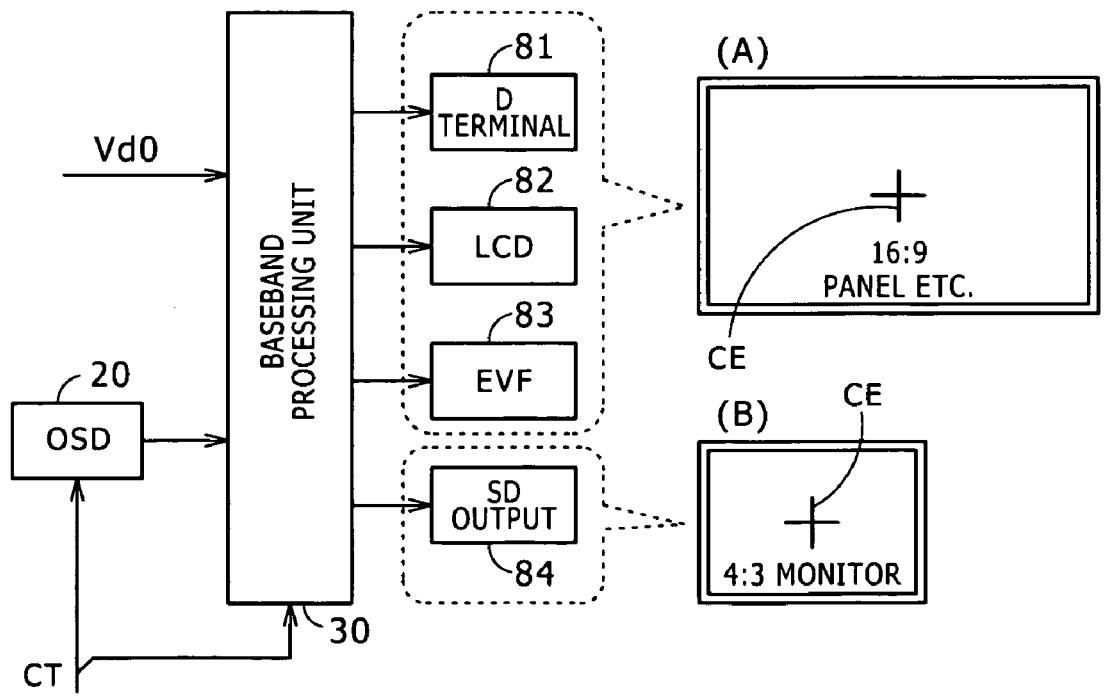
FIG. 6 illustrates the use of a center marker for each video output terminal.
Figure 7:
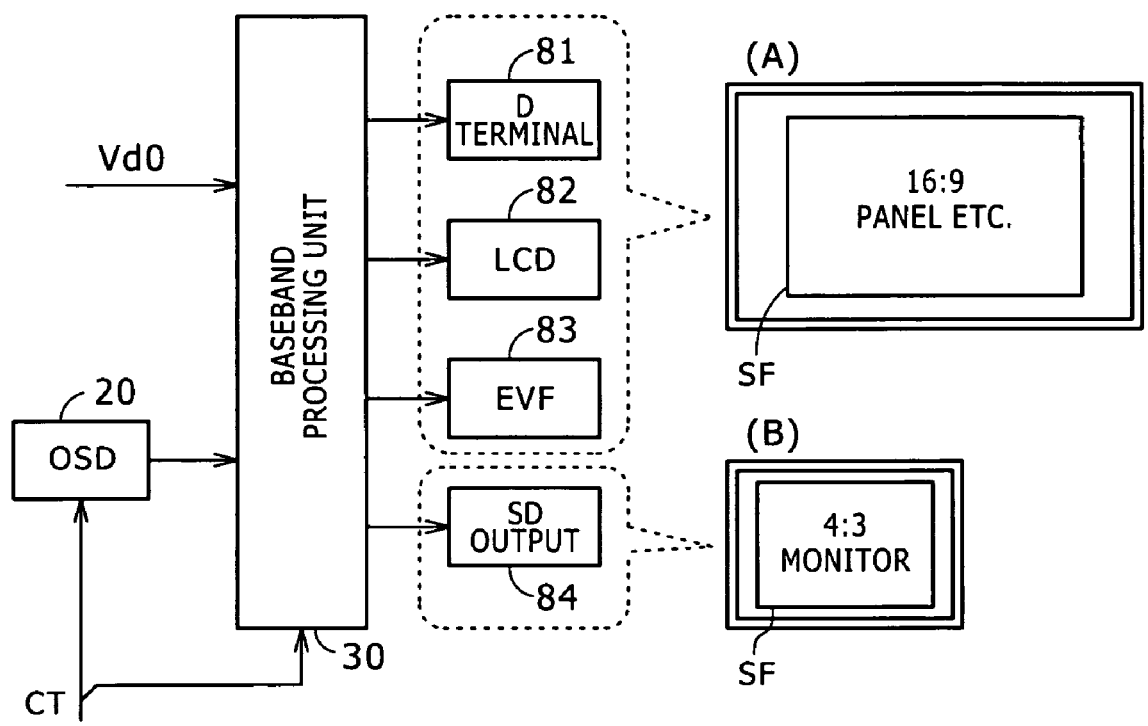
FIG. 7 illustrates the use of a safety zone marker for each video output terminal.

FIGS. 5 through 7 illustrate the use of capture assist markers for the respective video output terminals. FIG. 5 shows that the 4:3 marker SD is configured to be displayed. FIG. 6 shows that the center marker CE is configured to be displayed. FIG. 7 shows that the safety zone marker SF is configured to be displayed.

For example, the 4:3 marker SD, even when configured to be displayed, indicates an effective field angle (effective capture area) as an SD video when an HD video at the 16:9 field angle is down-converted into an SD video. It is meaningless to synthesize the 4:3 marker SD with an SD signal that has the aspect ratio of 4:3 and is output to the SD output terminal 84.

As shown in FIG. 5, the control unit 100 of the digital video camera according to the embodiment controls the OSD unit 20 to generate the 4:3 marker SD to be synthesized with video signals supplied to the D terminal 81, the LCD 82, and the EVF 83 and supply the 4:3 marker SD to the baseband processing unit 30. In addition, the control unit 100 controls the baseband processing unit 30 to synthesize the 4:3 marker SD from the OSD unit 20 with the video signals supplied to the D terminal 81, the LCD 82, and the EVF 83 and not to synthesize the 4:3 marker with video signals supplied to the SD output terminal 84.

As shown in FIG. 5(A), the 4:3 marker SD can be synthesized with video signals supplied to the D terminal 81, the LCD 82, and the EVF 83 so as to be capable of being output. The 4:3 marker is meaningless to a video signal output through the SD output terminal 84. As shown in FIG. 5(B), the 4:3 marker SD, even when configured to be displayed, can be prevented from being synthesized with that video signal.

The center marker CE is used to align the center and approximately horizontal and vertical levels for video. When the center marker CE is configured to be displayed, it is meaningful when synthesized with video signals to be output to the D terminal 81, the LCD 82, the EVF 83, and the SD output terminal 84.

As shown in FIG. 6, the control unit 100 of the digital video camera according to the embodiment controls the OSD unit 20 to generate the center marker SD to be synthesized with video signals supplied to the D terminal 81, the LCD 82, and the EVF 83. In addition, the control unit 100 controls the OSD units to generate the center marker SD to be synthesized with video signals supplied to the SD output terminal 84. The control unit 100 controls the baseband processing unit 30 to synthesize the corresponding 4:3 marker SD from the OSD unit 20 with video signals supplied to the D terminal 81, the LCD 82, the EVF 83, and the SD output terminal 84.

When the center marker CE is configured to be displayed as shown in FIG. 6(A), the center marker CE is displayed at the center of a video formed by video signals output from the D terminal 81, the LCD 82, and the EVF 83. As shown in FIG. 6(B), the center marker CE is displayed at the center of a video formed by video signals output from the SD output terminal 84.

The safety zone marker SF is used to reproduce captured video and simulates an area supposed to be displayed on most ordinary television sets. When the safety zone marker SF is configured to be displayed, it is meaningful when synthesized with video signals to be output to the D terminal 81, the LCD 82, the EVF 83, and the SD output terminal 84.

The control unit 100 of the digital video camera according to the embodiment controls the OSD unit 20 as shown in FIG. 7 to generate the safety zone marker SF to be synthesized with video signals supplied to the D terminal 81, the LCD 82, and the EVF 83. In addition, the control unit 100 generates the safety zone marker SF to be synthesized with video signals supplied to the SD output terminal 84. The control unit 100 controls the baseband processing unit 30 to synthesize the corresponding safety zone marker SF from the OSD unit 20 with video signals supplied to the D terminal 81, the LCD 82, the EVF 83, and the SD output terminal 84.

When the safety zone marker SF is configured to be displayed as shown in FIG. 7(A), the safety zone marker SF is displayed for a video formed by video signals output from the D terminal 81, the LCD 82, and the EVF 83. As shown in FIG. 7(B), the safety zone marker SF is displayed for a video formed by video signals output from the SD output terminal 84. In this case, the frame size is changed depending on the HD output system and the SD output system.

When the capture assist marker is configured to be displayed, it may be meaningless and unnecessary depending on the formats of video signals supplied to the multiple video output terminals, for example. The digital video camera according to the embodiment can prevent such capture assist marker from being displayed.

Accordingly, the capture assist markers can be correctly displayed in accordance with the usage of each output terminal. It is possible to settle the composition agreeable to users who are viewing their respective videos.

Using a Direct Key (Claims 5, 6, 11, and 12)

As mentioned above, the operation key such as the arrow key on the operation unit 110 is used to display or hide the capture assist markers or the entire capture assist marker depending on the menus displayed on the display screen 82G of the LCD 82. As described with reference to FIGS. 3 and 4, however, multiple operations may be needed for an intended process. This may be inconvenient and time-consuming to users.

During capturing, a user may or may not want to display the capture assist marker. The user may miss a capture chance when he or she opens the menu as needed to display or hide the capture assist marker.

To solve this problem, the operation unit 110 is provided with a switching key that can be directly operated to display or hide at least the multiple capture assist markers as a whole. For example, let us suppose that a user captures an object by confirming its video through the EVF 83 and then operates the switching key. The control unit 100 controls the OSD unit 20 and the baseband processing unit 30 to be capable of switching between displaying and hiding the three types of capture assist markers as a whole.

A single operation (single action) of the directly operable switching key can display the capture assist markers when needed and hide them when unneeded.

While there has bee described the case of displaying or hiding the three types of capture assist markers at a time, the invention is not limited thereto. For example, it may be preferable to provide a switching key for the center marker to display or hide it, a switching key for the 4:3 marker to display or hide it, and a switching key for the safety zone marker to display or hide it. These switching keys can be independently operated to switch between displaying and hiding each of the capture assist markers.

Accordingly, the user can specify various system information using the GUI (Graphics User Interface) displayed on the LCD 82 and using the switch mounted on the digital video camera body. The control unit controls the OSD unit 20 to generate the GUI that can be displayed on the display screen 85G of the LCD 85. When the switch provided for the body is operated for input, the control unit 100 can monitor an input port of the switch to perform a specified operation according to the input state.

The capture assist markers can be displayed or hidden through the use of the operation key such as a directly operable switch provided for the operation unit 110 of the digital video camera. A single action can be taken to immediately hide or display the capture assist markers during capture.

A user can quickly display or hide the capture assist markers at any timing through a simple operation of pressing the special switch provided for the body independently of whether or not the body is operated for capturing. It is possible to prevent a capture chance from being lost due to menu operations that require procedures to some extent.

Processes Associated with the Capture Assist Markers

With reference to FIGS. 8 through 11, the following describes processes associated with the capture assist markers in the digital video camera. The control unit 100 mainly performs the processes associated with the capture assist markers to be described below.

Selecting the Capture Assist Markers

Figure 8:
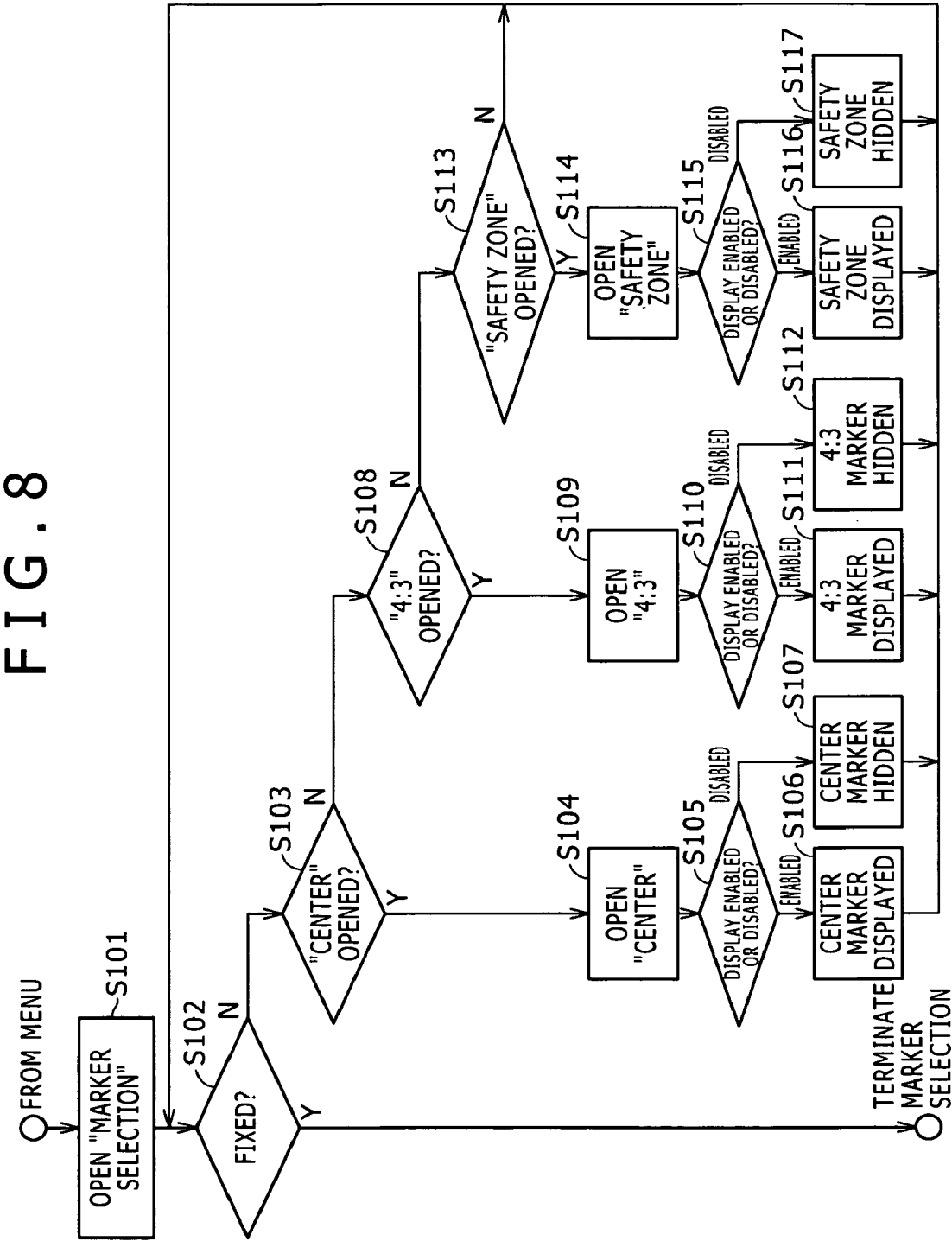
FIG. 8 is a flowchart showing a process to select the capture assist marker.

The following describes selection of the capture assist markers to be used for the digital video camera according to the embodiment. FIG. 8 is a flowchart showing the process to select the capture assist markers. As described with reference to FIG. 3, a user may choose "marker selection" from the selection items displayed in the camera setup menu Mn and fix the marker. The control unit 100 displays the marker selection menu Mk as shown in FIG. 3(B) on the display screen 82G (Step S101) and becomes ready for accepting user's input operation.

The control unit 100 determines whether or not a fix operation (end operation) is performed for the marker selection menu Mk (Step S102). When the determination process at Step S102 shows that the fix operation is performed, the control unit 100 terminates the process in FIG. 8 and returns the display to the camera setup menu as shown in FIG. 3(A).

When the determination process at Step S102 shows that no fix operation is performed, the control unit 100 determines whether or not a display item is selected for the center marker (Step S103). When the determination process at Step S102 shows that a display item is selected for the center marker, the control unit 100 controls the OSD unit 20 and the baseband processing unit 30 to display the setup screen for the center marker CE as shown in FIG. 3(C) on the display screen 82G of the LCD 82 (Step S104) so as to accept the display setup.

The control unit 100 determines whether the display is on or off (enabled or disabled) (Step S105). When the display is determined to be enabled (on), the control unit 100 places information in the flash ROM 102 so as to indicate "center marker displayed" (Step S106). When the display is determined to be disabled (off) in the determination process at Step S105, the control unit 100 places information in the flash ROM 102 so as to indicate "center marker hidden" (Step S107). After the process at Step S106 or S107, the control unit 100 repeats the process from Step S102.

When the determination process at Step S103 shows that no display item is selected for the center marker, the control unit 100 determines whether or not a display item is selected for the 4:3 marker (Step S108). When the determination process at Step S108 shows that a display item is selected for the 4:3 marker, the control unit 100 controls the OSD unit 20 and the baseband processing unit 30 to display the setup screen for the 4:3 marker as shown in FIG. 3(D) on the display screen 82G of the LCD 82 (Step S109) so as to accept the display setup.

The control unit 100 determines whether the display is enabled or disabled (on or off) (Step S110). When the display is enabled (on), the control unit 100 places information in the flash ROM 102 so as to indicate "4:3 marker displayed" (Step S111). When the determination process at Step S110 shows that the display is disabled (off), the control unit 100 places information in the flash ROM 102 so as to indicate "4:3 marker hidden" (Step S112). After the process at Step S111 or S112, the control unit 100 repeats the process from Step S102.

When the determination process at Step S108 shows that no display item is selected for the 4:3 marker, the control unit 100 determines whether or not a display item is selected for the safety zone marker (Step S113). When the determination process at Step S113 shows that a display item is selected for the safety zone marker, the control unit 100 controls the OSD unit 20 and the baseband processing unit 30 to display the setup screen for the safety zone marker as shown in FIG. 3(E) on the display screen 82G of the LCD 82 (Step S114) so as to accept the display setup.

The control unit 100 determines whether the display is enabled or disabled (on or off) (Step S114). When the display is enabled (on), the control unit 100 places information in the flash ROM 102 so as to indicate "safety zone marker displayed" (Step S116). When the determination process at Step S115 shows that the display is disabled (off), the control unit 100 places information in the flash ROM 102 so as to indicate "safety zone marker hidden" (Step S117). After the process at Step S116 or S117, the control unit 100 repeats the process from Step S102.

When the determination process at Step S113 shows that no display item is selected for the safety zone marker, the control unit 100 repeats the process after Step S102.

The digital video camera according to the embodiment makes it possible to configure whether or not to use the three types of capture assist markers individually.

Displaying or Hiding the Capture Assist Markers as a Whole

Figure 9:
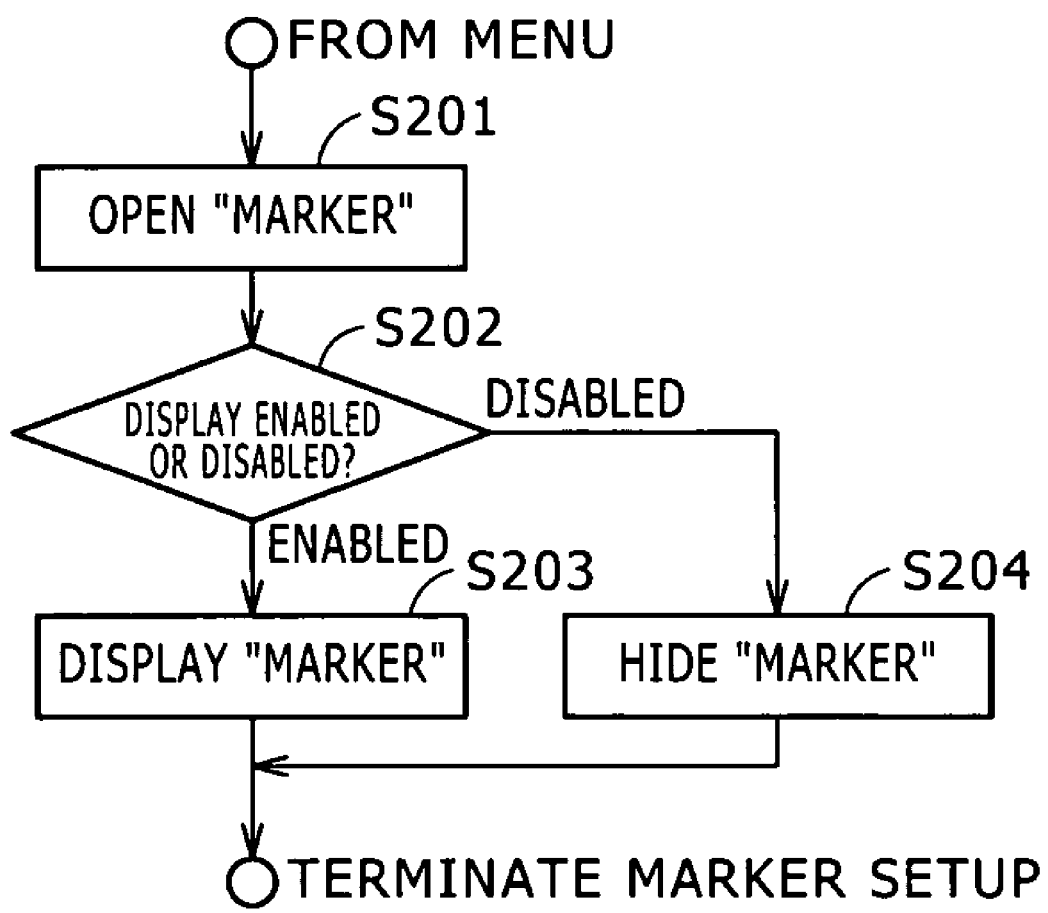
FIG. 9 is a flowchart showing a process to display or hide the capture assist markers as a whole.

FIG. 9 is a flowchart showing a process to display or hide the capture assist markers as a whole. The process as described with reference to FIG. 8 individually enables or disables the display of the capture assist markers. After this, the digital video camera according to the embodiment can enable or disable the display of the three types on capture assist markers as a whole as described with reference to FIG. 4.

An input operation is performed to select and fix "marker" from the selection items displayed on the camera setup menu Mn as shown in FIG. 4(A). The setup screen for displaying or hiding the entire capture assist markers as shown in FIG. 4(B) on the display screen 82G of the LCD 82 (Step S201) to accept user's input operations.

The control unit 100 determines which display setting is accepted (Step S202). The determination process at Step S202 may show that the accepted input operation enables (turns on) the display of the entire capture assist markers. In this case, the control unit 100 the control unit 100 places information in the flash ROM 102 so as to display the entire capture assist markers (Step S203).

The determination process at Step S202 may show that the accepted input operation disables (turns off) the display of the entire capture assist markers. In this case, the control unit 100 the control unit 100 places information in the flash ROM 102 so as to hide the entire capture assist markers (Step S204).

After the process at Step S203 or S204, the control unit 100 terminates the process of displaying or hiding the entire capture assist markers as shown in FIG. 9. After displaying or hiding the individual capture assist markers, the digital video camera according to the embodiment can display or hide the entire capture assist markers.

Displaying the Capture Assist Markers

The following describes a process to display the capture assist markers. FIG. 10 is a flowchart showing the process to display the capture assist markers. The control unit 100 performs the process in FIG. 10 at the beginning of capture or at an initial stage of capture standby mode, for example.

The control unit 100 performs the process in FIG. 10 during capture or at the time of capture standby. The control unit 100 references the setup information in the flash ROM 102 and determines whether or not the 4:3 marker is displayed (display enabled) (Step S301). When the determination process at Step S301 shows that the 4:3 marker is displayed, the control unit 100 allows the OSD unit 20 to generate the 4:3 marker to be synthesized with a video signal with an aspect ratio of 16:9 (Step S302).

When the determination process at Step S301 shows that the 4:3 marker is hidden, or after the process at Step S302, the control unit 100 determines whether or not the setup information in the flash ROM 102 indicates the displayed state (display enabled) of the center marker (Step S303). When the determination process at Step S303 shows that the center marker is configured to be displayed, the control unit 100 allows the OSD unit 20 to generate the center marker (Step S304).

When the determination process at Step S303 shows that the center marker is hidden, or after the process at Step S304, the control unit 100 determines whether or not the setup information in the flash ROM 102 indicates the displayed state (display enabled) of the safety zone marker (Step S305). When the determination process at Step S303 shows that the safety zone marker is configured to be displayed, the control unit 100 allows the OSD unit 20 to generate the safety zone marker to be synthesized with a video signal with an aspect ratio of 16:9 (Step S306).

The control unit 100 controls the OSD processing unit 20 to supply the baseband processing unit 30 with the generated capture assist markers (Step S307). The control unit 100 allows the baseband processing unit 30 to synthesize the supplied capture assist markers with video signals with an aspect ratio of 16:9, i.e., HD signals. The control unit 100 allows the HD output systems (D terminal 81, LCD 82, and EVF 83) to output a video synthesized with the capture assist markers (Step S308).

The control unit 100 references the setup information in the flash ROM 102 to determine whether or not the 4:3 marker is configured to be displayed (display enabled) (Step S309). Even when the determination process at Step S309 shows that the 4:3 marker is configured to be displayed, the control unit 100 disallows the OSD unit 20 to generate the 4:3 marker so as not to be displayed for the SD output system (Step S310).

When the determination process at Step S309 shows that the 4:3 marker is hidden, or after the process at Step S310, the control unit 100 determines whether or not the setup information in the flash ROM 102 indicates the displayed state (display enabled) of the center marker (Step S311). When the determination process at Step S311 shows that the center marker is configured to be displayed, the control unit 100 allows the OSD unit 20 to generate the center marker to be generated (Step S312).

When the determination process at Step S311 shows that the center marker is hidden, or after the process at Step S312, the control unit 100 determines whether or not the setup information in the flash ROM 102 indicates the displayed state (display enabled) of the safety zone marker (Step S313). When the determination process at Step S313 shows that the safety zone marker is configured to be displayed, the control unit 100 allows the OSD unit 20 to generate the safety zone markers to be synthesized with video signals with an aspect ratio of 4:3 (Step S314).

The control unit 100 controls the OSD processing unit 20 to supply the baseband processing unit 30 with the generated capture assist markers (Step S315). The control unit 100 allows the baseband processing unit 30 to synthesize the supplied capture assist markers with video signals with an aspect ratio of 4:3, i.e., SD signals. The control unit 100 allows the SD output system (SD output terminal 84) to output a video synthesized with the capture assist markers (Step S316).

In this manner, the capture assist markers enabled to be displayed are generated in accordance with the formats of video signals supplied to multiple video output terminals. The generated capture assist markers are synthesized with the video signals and are output from the corresponding video output terminals.

The center marker is displayed to indicate the center of video for HD and SD signals. The video center is not misaligned independently of HD or SD signals. Of course, in consideration for influence of down-conversion from HD signals to SD signals, it is possible to separately provide and use center markers for HD signals and SD signals so as to accurately indicate the center for each of HD signals and SD signals.

Removing the Capture Assist Markers

The following describes a process to remove the display of all the capture assist markers by operating the switching key that enables or disables the display of the entire capture assist markers as mentioned above. FIG. 11 is a flowchart showing the process to remove the display of all the capture assist markers.

There is provided the switch key that enables or disables the display of the entire capture assist markers. Pressing this switching key can remove (disable) the display of all the capture assist markers. At this time, the control unit 100 performs the process shown in FIG. 11. The control unit 100 first allows the OSD unit 20 to remove the 4:3 marker to be synthesized with HD signals with an aspect ratio of 16:9 (Step S401). The control unit 100 then allows the OSD unit 20 to remove the center marker (Step S402). The control unit 100 then allows the OSD unit 20 to remove the safety zone marker (Step S403).

The control unit 100 allows the OSD unit 20 to supply the baseband processing unit 30 with OSD data to be synthesized with video signals and to stop synthesizing the so far synthesized capture assist markers (Step S404). The control unit 100 allows the video output terminals to output video signals that are not synthesized with the capture assist markers (Step S405).

This allows the video output terminals to output video signals from which the capture assist markers are removed.

The capture assist markers can be removed by controlling the OSD unit 20 so as to stop generating the capture assist markers and supplying the capture assist markers to the baseband processing unit 30. Alternatively, the capture assist markers can be removed by forcing the baseband processing unit 30 to stop synthesizing the capture assist markers from the OSD unit 20.

Other Examples of the Capture Assist Markers

As described with reference to FIG. 2, there has been described the three types of capture assist markers, i.e., the center marker CE, the 4:3 marker SD, and the safety zone marker SF according to the above-mentioned embodiment. However, the capture assist markers are not limited to the above-mentioned three types.

Figure 12A:
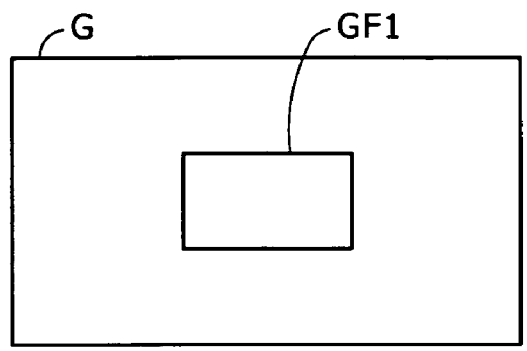
FIG. 12A shows another example of the capture assist marker.
Figure 12B:
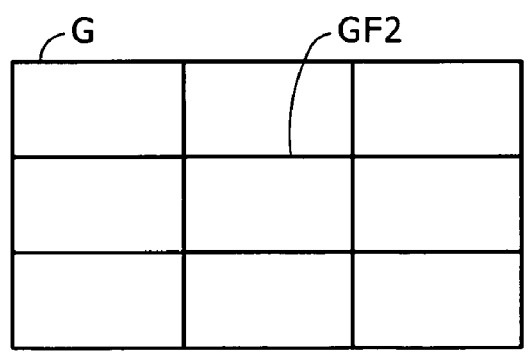
FIG. 12B shows still another example of the capture assist marker.
Figure 12C:
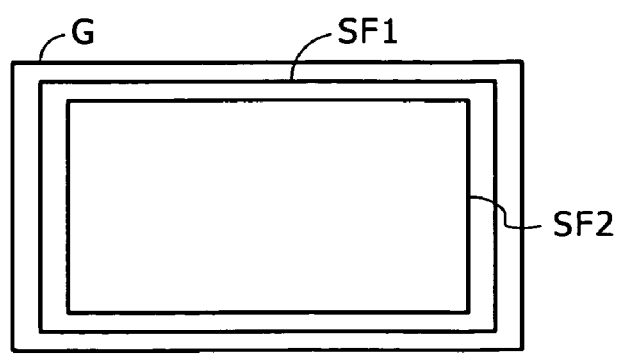
FIG. 12C shows yet another example of the capture assist marker.

FIGS. 12A through 12C show the other examples of the capture assist markers. FIG. 12A shows a guide frame marker GF1 that indicates the center of a display screen G and sizes one ninth of its display area. FIG. 12B shows a 9-segment guide frame marker GF2 that divides the display area of the display screen G into nine portions. FIG. 12C shows a 90% safety zone marker SF1 indicating a 90% area of a display image and an 80% safety zone marker SF2 indicating an 80% area of a display image. Of course, the other various capture assist markers can be used.

Various capture assist markers having similar meanings can be used in different display modes such as display colors, line types, and frame shapes, for example. It is also possible to allow users to freely change display colors, line types, and frame shapes for each of the capture assist markers.

In this case, each capture assist marker may be capable of provided with not only the information about enabling or disabling the display, but also the information indicating display colors, line types, and frame shapes. The OSD unit 20 simply needs to generate the corresponding capture assist markers. The invention is applicable when there is a need for a possibility of simultaneously using different available capture assist markers.

The above-mentioned digital video camera according to the embodiment changes the generation modes and the displayed or hidden state of the capture assist markers according to output destinations of video signals for a video captured through the camera unit 10. However, the invention is not limited thereto. Even though video signals are supplied to the same output destination, it is possible to change the generation modes and the displayed or hidden state of the capture assist markers according to the video signal formats.

Normally, the 16:9 panel displays HD video. When displaying an SD-converted video, the 16:9 panel displays it as a video extracted at the 4:3 field angle. In this case, it is also possible to generate a capture assist marker suited for the 4:3 field angle and synthesize the capture assist marker with the video for display. When there may be an attempt to display a 4:3 marker on the LCD 83, the SD-converted video already has the 4:3 field angle. The 4:3 marker can be hidden even when it is enabled for display.

From the viewpoint of changing the display of capture assist markers depending on output destinations, it is also possible to display or hide the capture assist marker corresponding to each output destination so that the capture assist markers can be used according to user needs.

While the above-mentioned embodiment has presented the example of applying the invention to the digital video camera, the invention is not limited thereto. The invention can be applied to various imaging apparatuses such as digital still cameras, and analog video cameras or still cameras, for example.

As described with reference to FIGS. 3 and 4, the digital video camera according to the embodiment allows the intended capture assist marker to be selected and then allows the selected capture assist marker as a whole to be displayed or hidden. However, the invention is not limited thereto. Simply selecting the intended capture assist marker can display or hide the selected capture assist marker. That is, it is possible to omit the setup process to display or hide the selected capture assist markers as a whole as described with reference to FIG. 4.

The invention claimed is:

1. An imaging apparatus comprising:
an imaging unit for imaging an object and outputting a video signal;
output terminal units for outputting the video signal in different formats including a first output format and a second output format;
a generation unit for generating capture assist marks to be synthesized with the video signal output, the capture assist marks including (i) a first capture assist mark, within a displayed capture area, corresponding to the first output format, the first capture assist mark comprising a capture assist mark displayed within an effective capture area of the first output format or, when the displayed capture area is greater than the effective capture area of the first output format, at least one of the effective capture area of the first output format or a safety zone of the first output format and (ii) a second capture assist mark, within the displayed capture area, corresponding to the second output format, the second capture assist mark comprising a capture assist mark displayed within an effective capture area of the second output format or, when the displayed capture area is greater than the effective capture area of the second output format, at least one of the effective capture area of the second output format or a safety zone of the second output format;
a synthesis unit for synthesizing the capture assist marks with the video signal;
an acceptance unit for accepting an instruction input about the capture assist marks; and
a control unit for controlling the output of the video signal by the output terminal units, the controlling comprising:
determining a format of the different formats used by one of the output terminal units; and
controlling the generation unit and the synthesis unit, based on (i) the instruction input accepted through the acceptance unit and (ii) the determined format of the different formats, to synthesize one or more of the capture control marks for the one of the output terminal units.

2. The imaging apparatus according to claim 1 comprising:
a selection input acceptance unit for accepting selection input of a plurality of capture modes to output the video signal in different formats; and
a capture mode change unit for controlling the imaging unit in accordance with the selection input accepted through the selection input acceptance unit and enabling a selected capture mode,
wherein the control unit controls the generation unit so as to generate the capture assist mark in accordance with the selected capture mode.

3. The imaging apparatus according to claim 1 comprising:
a selection input acceptance unit for accepting selection input of a plurality of capture modes to output the video signal in different formats; and
a capture mode change unit for controlling the imaging unit in accordance with the selection input accepted through the selection input acceptance unit and enabling a selected capture mode,
wherein the control unit controls whether or not to synthesize a capture assist mark generated by the generation unit in accordance with the selected capture mode.

4. The imaging apparatus according to claim 1,
wherein the acceptance unit can accept selection input of a capture assist mark generated at least from the capture assist marks.

5. The imaging apparatus according to claim 1 comprising:
change input acceptance unit for directly accepting input for a change between displaying and hiding the capture assist marks as a whole generated by the generation unit; and
change control unit for changing between displaying and hiding the capture assist marks as a whole in accordance with the change input accepted through the change input acceptance unit.

6. A capture assist mark usage control method for an imaging apparatus having an imaging unit for imaging an object image and capturing the same as a video signal, wherein the method is used for synthesizing a capture assist mark with a video signal captured by the imaging unit and comprises:
accepting an instruction input about the capture assist mark;
determining a format of different formats that will be used to output the video signal;
generating N (N is 1 or larger integer) types of capture assist markers in accordance with (i) the accepted instruction input and (ii) the determined format, the capture assist marks including (i) a first capture assist mark, within a displayed capture area, corresponding to a first format of the different formats, the first capture assist mark comprising a capture assist mark displayed within an effective capture area of the first format or, when the displayed capture area is greater than the effective capture area of the first format, at least one of the effective capture area of the first format or a safety zone of the first format and (ii) a second capture assist mark, within the displayed capture area, corresponding to a second format of the different formats, the second capture assist mark comprising a capture assist mark displayed within an effective capture area of the second format or, when the displayed capture area is greater than the effective capture area of the second output format, at least one of the effective capture area of the second format or a safety zone of the second format; and
synthesizing N types of capture assist marks generated at the generation step with the video signal from the imaging unit; and
outputting the video signal in the different formats by an output unit for each of the different formats.

7. The capture assist mark usage control method according to claim 6 comprising:
accepting selection input of a plurality of capture modes to generate differently formatted video signals; and
controlling the imaging unit in accordance with the selection input and enabling a selected capture mode,
wherein the generation step controls generation of the capture assist mark in accordance with the selected capture mode.

8. The capture assist mark usage control method according to claim 6 comprising:
accepting selection input of a plurality of capture modes to generate differently formatted video signals; and
controlling the imaging unit in accordance with the selection input and enabling a selected capture mode,
wherein the synthesis step controls synthesis of the capture assist mark in accordance with the selected capture mode.

9. The capture assist mark usage control method according to claim 6,
wherein the acceptance step accepts input for selecting a capture assist mark to be generated at least from a plurality of types of capture assist marks.

10. The capture assist mark usage control method according to claim 6 comprising:
accepting input for a change between displaying and hiding the plurality of capture assist marks as a whole generated at the generation step; and
changing between displaying and hiding the plurality of capture assist marks as a whole in accordance with the change input accepted at the change input acceptance step.

11. An imaging apparatus comprising:
an imaging unit for imaging an object and outputting a video signal;
output terminal units which use different formats to output video signals output from the imaging unit,
a generation unit for generating, in accordance with a format of the video signal to be supplied to each of the output terminal units, a plurality of types of capture assist marks, the capture assist marks including (i) a first capture assist mark, within a displayed capture area, corresponding to a first format of the different formats, the first capture assist mark comprising a capture assist mark displayed within an effective capture area of the first format or, when the displayed capture area is greater than the effective capture area of the first format, at least one of the effective capture area of the first format or a safety zone of the first format and (ii) a second capture assist mark, within the displayed capture area, corresponding to a second format of the different formats, the second capture assist mark comprising a capture assist mark displayed within an effective capture area of the second format or, when the displayed capture area is greater than the effective capture area of the second output format, at least one of the effective capture area of the second format or a safety zone of the second format;
a synthesis unit for synthesizing the generated capture assist marks with the video signal to be supplied to each of the plurality of output terminal units;
an acceptance unit for accepting an instruction input about the capture assist mark; and
a control unit for controlling the output of the video signal by the output terminal units, the controlling comprising:

determining a format for one of the output terminal units; and controlling the generation unit and the synthesis unit based on (i) the accepted instructions and (ii) the determined format, to synthesize one or more of the capture control marks for the one of the output terminal units.

12. The imaging apparatus according to claim 11 comprising:

a selection input acceptance unit for accepting selection input of a plurality of capture modes to generate differently formatted video signals; and a capture mode change unit for controlling the imaging unit in accordance with the accepted selection input and enabling a selected capture mode, wherein the control unit controls the generation unit so as to generate the capture assist mark in accordance with the selected capture mode.

13. The imaging apparatus according to claim 11 comprising:

selection input acceptance unit for accepting selection input of a plurality of capture modes to generate differently formatted video signals; and capture mode change unit for controlling the imaging unit in accordance with the selection input accepted through the selection input acceptance unit and enabling a selected capture mode, wherein the control unit controls whether or not to synthesize a capture assist mark in accordance with the selected capture mode.

14. The imaging apparatus according to claim 1, wherein the acceptance unit is configured to accept selection input of a capture assist mark generated at least from the capture assist marks.

15. The imaging apparatus according to claim 1 comprising:

a change input acceptance unit for directly accepting input for a change between displaying and hiding the capture assist marks as a whole generated by the generation unit; and a change control unit for changing between displaying and hiding the capture assist marks as a whole in accordance with the change input accepted through the change input acceptance unit.

* * * * *